United States Patent Office 2,919,260
Patented Dec. 29, 1959

2,919,260

RUBBER COMPOSITION AND ACTIVATED FILLER FOR USE THEREIN

Jean Augustin, Paris, France, assignor to Société Franterre, Paris, France

No Drawing. Application January 3, 1956
Serial No. 556,809

Section 1, Public Law 690, August 8, 1946
Patent expires July 24, 1966

31 Claims. (Cl. 260—41.5)

This invention relates to the vulcanization of rubber and similar elastomers, and more particularly to the use of activated cryptocrystalline clays as fillers therefor.

It is an object of the invention to improve the characteristics of vulcanized rubber prepared with the use of cryptocrystalline clays as fillers through increase in its physical and mechanical strength characteristics, and more specifically its ultimate tensile strength and ultimate elongation and its Shore hardness number.

A further object is to provide an improved rubber mix containing a cryptocrystalline clay as a filler and which is capable of successful vulcanization within a reasonable time.

As described in my U.S. Patent No. 2,689,841, the application for which was copending with application Serial No. 219,119 filed April 3, 1951 of which the present application is a continuation-in-part, I have discovered that high strength characteristics may be imparted to vulcanized rubber prepared from vulcanizable rubber compositions in which certain cryptocrystalline clays, e.g., a halloysitic clay, are used as reinforcing filler materials.

As is more particularly described in the above identified U.S. patent application, I have found that the desired high strength and other physical properties are obtainable with the use of any of a wide variety of cryptocrystalline clays whereof the average particle size is less than 200 millimicrons. Besides the halloysites, other cryptocrystalline clays that I have found to be suitable are the microkaolinites, the allophanes and the attapulgites, providing they have an average particle size of less than 200 millimicrons. The clays that are preferred belong to the class of hydrous aluminum silicates, although others that are cryptocrystalline and possess the requisite fineness may be employed. In general, to be suitable for my purposes the clay should not include any substantial proportion of particles having a diameter equal to or greater than 0.5 micron.

The physical and mechanical strength characteristics obtained with the use of such cryptocrystalline clays are superior to these heretofore obtained with china clays and similar earthy materials and compare favorably with those obtained when carbon black is used. However, as compared with rubber compositions in which carbon blacks and similar filler materials are used, rubber compositions containing cryptocrystalline clays normally require a more prolonged vulcanization period to attain the desired vulcanized product.

As disclosed in said application, Serial No. 219,119 which was a continuation-in-part of my U.S. application Serial No. 764,571, filed July 29, 1947, both now abandoned, I have also found that rubber mixes containing clays selected from the above mentioned class of cryptocrystalline clays may be vulcanized within a normal or reasonable vulcanizing period of time to acquire high physical and mechanical characteristics by incorporating into the mix a substance that releases ammonia at temperatures within the rubber vulcanizing temperature range, i.e., between 120 and 180° C., and which does not at the same time liberate an acid component having objectionable effects. Among such substances adapted to release ammonia in the temperature range just stated are the ammonium salts of weak acids such as the carbonates, borates, tartrates, citrates, and the like, and the condensation products of ammonia with an aldehyde such as hexamethylenetetramine, and the like.

The ammonium salts of strong acids, such as ammonium chloride and ammonium sulfate, are not suitable for use in the invention, as will appear from the hereinafter disclosed summary of experiments made by me in this connection.

One series of tests was carried out to activate a halloysitic clay by means of various ammonium compounds adapted to release ammonia at temperatures within the normal rubber vulcanizing temperature range.

The basic rubber mix tested had the following composition, the proportions being stated in part by weight:

| | |
|---|---|
| Smoked rubber sheet | 100 |
| Zinc oxide | 6 |
| Stearic acid | 3 |
| Pine tar | 2 |
| Sulfur | 2.5 |
| Benzothiazyl | 0.8 |
| Diphenyl guanidine | 0.4 |
| Halloysitic clay from the Provins district (France) | 60 |

The ammonium salts of two strong acids (chloride and sulfate), the ammonium salts of three representative weak acids (tartrate, citrate and carbonate), and lastly hexamethylenetetramine, were incorporated into portions of this mix, and the resulting product was vulcanized and then subjected to test. The following results were obtained:

| | Unactivated comparison sample | Ammonium sulfate | Ammonium chloride | Ammonium tartrate | Ammonium citrate | Ammonium carbonate | Hexamethylene tetramine |
|---|---|---|---|---|---|---|---|
| Parts by weight of activating compound per 100 parts of rubber | 0 | 3 | 3 | 3 | 3 | 2 | 1.8 |
| Optimum vulcanizing time at 143° C., min | 30 | 20 | 20 | 10 | 10 | 5 | 5 |
| Shore hardness No | 56 | 63 | 66 | 63 | 70 | 63 | 63 |
| Breaking stress, kg./sq. cm | 213 | 211 | 217 | 262 | 269 | 296 | 325 |
| Ultimate elongation, percent | 595 | 510 | 510 | 540 | 535 | 560 | 550 |

Thus it will be seen that the ammoniacal salts of the stronger acids gave no improvement in the mechanical characteristics of the resulting vulcanized rubber and in fact the hardness characteristics were inferior to those obtained with the use of the halloysitic clay without the addition of the ammonium compound.

The ammoniacal salts of the weaker acids on the other hand markedly reduced the vulcanizing time and conferred highly desirable mechanical properties to the mix, the improvement therein being the greater as salts of increasingly weak acids were used, as is particularly noticeable with the carbonate.

Very remarkable results were also obtained when using hexamethylenetetramine.

A second series of tests were carried out with a basic mix containing a microkaolinite as filler and having the following composition, proportions being given in parts by weight:

| | |
|---|---|
| Smoked rubber sheet | 100 |
| Zinc oxide | 6 |
| Stearic acid | 3 |
| Pine tar | 2 |
| Sulfur | 2.5 |
| Benzothiazyl disulfide | 0.8 |
| Diphenyl guanidine | 0.4 |
| Microkaolinite from the Provins district (France) | 60 |

When hexamethylenetetramine and ammonium carbonate were separately incorporated into this mix, the following results were obtained:

| | Unactivated comparison sample | Hexamethylenetetramine | Ammonium carbonate |
|---|---|---|---|
| Parts by weight of activating compound per 100 parts of rubber | 0 | 1.8 | 1.8 |
| Optimum vulcanizing time at 143° C., min | 25 | 5 | 5 |
| Shore hardness No | 55 | 63 | 59 |
| Breaking strength, kg./sq. cm | 225 | 325 | 316 |
| Ultimate elongation, percent | 620 | 550 | 560 |

The above table shows that, just as in the case of halloysite the base mixture containing microkaolinite as filler is considerably improved by the activation thereof with an ammonia salt of a weak acid or a condensation product of ammonia and an aldehyde.

It is remarkable, and was an unpredictable fact, that the addition to a rubber mixture containing, e.g., a halloysite as filler, of a substance capable of releasing ammonia at temperatures within the normal rubber vulcanizing temperature range imparts mechanical characteristics to the vulcanized rubber product produced from such mixture that are markedly superior to the characteristics that may be conferred, say, by a direct treatment of an otherwise similar mixture, but containing no ammonia releasing substance, in an atmosphere of air and ammonia.

I have made comparative tests by vulcanizing at 145° C. in an atmosphere of air and ammonia two mixes, the one containing ordinary carbon black as the conventional rubber filler therein and the other containing a halloysitic clay filler from the French Provins district. The vulcanization was effected in an electrically heated oven at ordinary pressure. The atmosphere in the oven was a mixture of air and ammonia generated by the decomposition of ammonia bicarbonate arranged in thin layers within the oven.

The compositions of the test batches were as follows:

| | 1st Batch | 2nd Batch |
|---|---|---|
| Smoked rubber sheet | 100 | 100 |
| Zinc oxide | 5 | 5 |
| Stearic acid | 3 | 3 |
| Tetramethylthiurame sulfide | 0.3 | 0.3 |
| Sulfur | 2.5 | 2.5 |
| Provins halloysitic clay | 60 | 0 |
| H.M.F. carbon black | 0 | 40 |

At the end of 30 minutes heating at 145° C. the first halloysite containing batch had not been vulcanized. The ultimate breaking stress of the second carbon black containing batch was 159 kg./sq. cm. and the ultimate elongation 350%. After 60 minutes at 145° C. the first batch still was not vulcanized. The breaking stress of the second batch was 74 kg./sq. cm. and elongation 315%.

These results clearly demonstrate that direct treatment with an air and ammonia mixture of a rubber mix containing halloysite filler, makes it possible neither to vulcanize the rubber nor to confer high grade mechanical characteristics to it, as it is possible to do when operating in accordance with the present invention.

The activated cryptocrystalline clay fillers of the present invention produce highly satisfactory results when added to synthetic elastomers as distinguished from natural rubber. This is illustrated by the results of vulcanization tests of two mixes, in one case using natural rubber and in the other using G.R.S. synthetic rubber, which latter is a co-polymerization product of about 75 parts butadiene and 25 parts styrolene. The rubber mix compositions and the test results are set forth below, the proportions being stated in part by weight:

| | I | II | III |
|---|---|---|---|
| Smoked rubber sheet | 100 | 100 | |
| G.R.S. synthetic rubber | | | 100 |
| Zinc oxide | 5 | 5 | 5 |
| Stearic acid | 3 | 3 | 3 |
| Sulfur | 2.5 | 2.5 | 2.5 |
| Benzothiazol disulphide | 1 | 1 | 1 |
| Diphenylguanidine | 0.4 | 0.4 | 0.4 |
| Phenyl-beta-Napthylamine | 1 | 1 | 1 |
| Pine tar | 2 | 2 | 2 |
| Provins halloysitic clay | 60 | 60 | 60 |
| Neutral ammonium carbonate | 2 | | 2 |
| Ammonium bicarbonate | | 2 | |
| Test results: | | | |
| Optimum vulcanization duration at 143° C., minutes | 10 | 10 | 20 |
| Ultimate tensile stress (breaking load) in kg./cm.² | 290 | 305 | 175 |
| Elongation, percent | 475 | 510 | 425 |
| Shore hardness | 65 | 66 | 70 |

I have also included in the above tabulation in column II the results of a test using ammonium bicarbonate as the activating ammonium compound which shows that equally as good and in fact somewhat better results are indicated when using the bicarbonate as are obtained when using the normal carbonate.

It will be noted that in all of the tests mentioned above the activated clay filler was used in a proportion of 60 parts to 100 parts of the rubber component of the mix. This happens to be an optimum proportion when the vulcanized product is to be used for various general purposes. It is to be understood, however, that the invention in its broader aspects is not limited to the use of any particular proportion of the activated filler. The proportion may be varied similarly as in the case of carbon black and other reinforcing and filler materials over a wide range depending upon the properties desired in the vulcanized product. When used as the sole or principal filler component the proportion may vary from 10 to 250% based on the rubber content and the properties desired in the vulcanized product such as elasticity, hardness, tensile strength, breaking elongation and abrasion. By way of example, when the product is intended for use in vehicle tires the clay proportion will ordinarily be around 60%. When shoe soles are involved the clay proportion may be between 120 and 150%, and when shoe heels are being made the clay proportion may be between 180 and 200%, in all cases based on the rubber content of the batch. It will also be understood that the cryptocrystalline clay may be used either alone or in association with other reinforcing agents or fillers since it contributes its reinforcing effect, to the extent it is present in the rubber mix, without regard to the presence of other reinforcing agents.

The following examples demonstrate mixtures having equal amounts of rubber and cryptocrystalline clay:

|  | 1st Batch | 2nd Batch |
| --- | --- | --- |
| Smoked rubber sheet | 100 | 100 |
| Zinc oxide | 5 | 5 |
| Stearic acid | 3 | 3 |
| Mineral oil | 5 | 5 |
| Phenylbetanaphtylamine | 1 | 1 |
| Sulfur | 2.5 | 2.5 |
| Benzothiazyl disulphide | 0.8 | 0.8 |
| Pigments and dyes | 5 | 5 |
| Diphenylguanidine | 0.4 | 0.4 |
| Halloysitic clay from the Provins district | 100 | 100 |
| Hexamethylenetetramine | 3 | |
| Ammonium bicarbonate | | 5 |
| Optimum vulcanizing time at 143° C., min | 10 | 10 |
| Shore hardness No | 73 | 71 |
| Breaking stress, kg./sq.cm | 234 | 225 |
| Ultimate elongation, percent | 465 | 450 |

As previously stated, the microkaolinite used in the tests hereinbefore described as well as the halloysitic clay used in such tests were both obtained from the Provins basin in France. Both of these clays are characterized by a microcrystalline structure and a very uniform particle size. In the case of the halloysite the average particle size was approximately 150 millimicrons and a considerable portion of the microcrystalline particles were within the small size range of 20-100 millimicrons. Similar deposits of microkaolinites and halloysites, as well as allophanes and attapulgites, are found in various parts of the world. It will be understood that the term "microkaolinite" is used to distinguish the extremely fine crystalline kaolinic clays from ordinary kaolin wherein the average particle size is much higher and usually within the range 500-2000 millimicrons.

The cryptocrystalline clays used as fillers may or may not be preliminarily subjected to purifying, corrective or selective treatments depending on their particular nature and the particular effect which it is desired to obtain.

The amount of ammonia derivative to be used will vary depending on the corrective and reinforcing effects to be obtained and on the nature of the derivative itself. An average range of proportions usually yielding good results may be given as from 1 to 5% of the clay proportion depending on the activating compound and on the character of the mix.

This invention may practically be carried out in various ways and by using various procedures.

The selection of the ammonia derivative used depends on operating conditions. It may differ according to whether it is to be applied to ordinary mixes made from dry rubber or dissolved or latex-base mixes.

The ammonia derivative may first be incorporated into the rubber and then the clay filler and other ingredients added, this procedure leading to a desirable dispersal effect. Again the ammonia derivative may be incorporated into a batch which already contains all of the other ingredients thereby preventing the batch from vulcanizing during the mixing operation.

Alternatively the ammonia derivative may be mixed with the clay before its incorporation into the rubber batch. This has been found to be the preferred method, particularly when hexamethylenetetramine is being used because it is difficult for the rubber manufacturers to crush the hexamethylenetetramine component fine enough to insure an intimate pulverized mixture with the clay. Moreover, it is desirable to allow a time interval between mixing the clay and any ammonia derivative and introducing the mixed component into the final rubber compounding mix so that the adsorbing power of the clay shall have sufficient time to insure better fixation of the ammonia derivative onto the clay particles.

One such composition has been 1.7 parts of hexamethylenetetramine to 100 parts of halloysitic clay. Another composition has been 2 parts of hexamethylenetramine to 100 parts of halloysitic clay. A preferred range when using hexamethylenetetramine is 1.5 to 2.5 parts thereof to 100 parts of clay. Another composition has been 4 parts of ammonium carbonate to 100 parts of halloysitic clay. When using ammonium carbonate a proportion within the range 3 to 5 parts of ammonium carbonate to 100 parts of clay is preferred. When using ammonium bicarbonate a range of 4 to 6 parts of ammonium bicarbonate to 100 parts of clay is preferred and by way of specific example a composition containing 5 parts of ammonium bicarbonate to 100 parts of clay will give good results. Similar proportions and ranges of proportions may be employed when the clay is one of the microkaolinites, allophanes and attapulgites.

It will be appreciated that the ammonia derivatives of this application apparently act only as activators for the particularly cryptocrystalline clays listed herein which not only reduce the vulcanizing time but confer highly desirable mechanical properties to the resulting vulcanized rubber product. The numerous examples of rubber mixes listed hereinbefore include regular vulcanizing accelerators but which appear to have little effect on the cryptocrystalline clays with which this application is concerned. Standard accelerators will aid acceleration of rubber mixtures using cryptocrystalline clays but not sufficient to be commercially feasible. However, even this poor acceleration is accompanied by a weakening of certain mechanical characteristics of the vulcanized product, whereas the activators of this invention reduce the vulcanization time to a commercially acceptable one and improve the mechanical properties.

Where a crystalline ammonia derivative is employed, the derivative may be reduced to powder form of very fine particle size prior to addition, or it may be preliminarily ground in the presence of a plasticizer.

Where the activator is to be applied in connection with latex base mixes, ammonia compounds that are insoluble or practically insoluble in water but readily dispersible, would preferably be selected.

I claim:

1. A vulcanizable rubber mix characterized by ability to acquire increased strength characteristics when vulcanized for a normal vulcanizing period and containing as a reinforcing filler a cryptocrystalline clay selected from the group consisting of halloysite, microkaolinite, allophane and attapulgite whereof the average particle size is less than 200 millimicrons and 1-5% by weight based on said clay of a substance capable of releasing ammonia at a temperature within the rubber-vulcanizing temperature selected from the group consisting of an ammonium salt of a weak acid and a condensation product of ammonia with an aldehyde.

2. A vulcanizable rubber mix as claimed in claim 1 wherein said cryptocrystalline clay is halloysite.

3. A vulcanizable rubber mix as claimed in claim 1 wherein said cryptocrystalline clay is microkaolinite.

4. A vulcanizable rubber mix as claimed in claim 1 wherein said cryptocrystalline clay is allophane.

5. A vulcanizable rubber mix as claimed in claim 1 wherein said cryptocrystalline clay is attapulgite.

6. A vulcanizable rubber mix as claimed in claim 1 wherein said ammonia releasing substance is an ammonium salt of a weak acid.

7. A vulcanizable rubber mix as claimed in claim 6 wherein said cryptocrystalline clay is halloysite.

8. A vulcanizable rubber mix as claimed in claim 6 wherein said cryptocrystalline clay is microkaolinite.

9. A vulcanizable rubber mix as claimed in claim 6 wherein said ammonium salt is ammonium bicarbonate.

10. A vulcanizable rubber mix as claimed in claim 6 wherein said ammonium salt is ammonium carbonate.

11. A vulcanizable rubber mix as claimed in claim 10 wherein said cryptocrystalline clay is halloysite.

12. A vulcanizable rubber mix as claimed in claim 10 wherein said cryptocrystalline clay is microkaolinite.

13. A vulcanizable rubber mix as claimed in claim 1 wherein said ammonia releasing substance is a condensation product of ammonia with an aldehyde.

14. A vulcanizable rubber mix as claimed in claim 13 wherein said condensation product is hexamethylenetetramine.

15. A vulcanizable rubber mix as claimed in claim 14 wherein said cryptocrystalline clay is halloysite.

16. A composition of matter adapted for incorporation into rubber prior to vulcanization, which consists essentially of a cryptocrystalline clay selected from the group consisting of halloysite, microkaolinite, allophane and attapulgite whereof the average particle size is less than 200 millimicrons and 1–5% by weight based on said clay of a substance capable of releasing ammonia at a temperature within the rubber-vulcanizing temperature range selected from the group consisting of an ammonium salt of a weak acid and a condensation product of ammonia with an aldehyde.

17. A composition of matter as claimed in claim 16 wherein said cryptocrystalline clay is halloysite.

18. A composition of matter as claimed in claim 16 wherein said cryptocrystalline clay is microkaolinite.

19. A composition of matter as claimed in claim 16 wherein said cryptocrystalline clay is allophane.

20. A composition of matter as claimed in claim 16 wherein said cryptocrystalline clay is attapulgite.

21. A composition of matter as claimed in claim 16 wherein said ammonia releasing substance is an ammonium salt of a weak acid.

22. A composition of matter as claimed in claim 21 wherein said ammonium salt is ammonium bicarbonate.

23. A composition of matter as claimed in claim 21 wherein said ammonium salt is ammonium carbonate.

24. A composition of matter as claimed in claim 21 wherein said cryptocrystalline clay is halloysite.

25. A composition of matter as claimed in claim 21 wherein said cryptocrystalline clay is microkaolinite.

26. A composition of matter as claimed in claim 16 wherein said ammonia releasing substance is a condensation product of ammonia with an aldehyde.

27. A composition of matter as claimed in claim 26 wherein said cryptocrystalline clay is halloysite.

28. A composition of matter as claimed in claim 26 wherein said cryptocrystalline clay is microkaolinite.

29. A composition of matter as claimed in claim 26 wherein said condensation product is hexamethylenetetramine.

30. A composition of matter as claimed in claim 29 wherein said cryptocrystalline is halloysite.

31. A composition of matter as claimed in claim 29 wherein said cryptocrystalline clay is microkaolinite.

No references cited.